Dec. 18, 1951  W. L. SCHEU  2,579,158
HEATING SYSTEM
Filed Feb. 24, 1948  2 SHEETS—SHEET 2
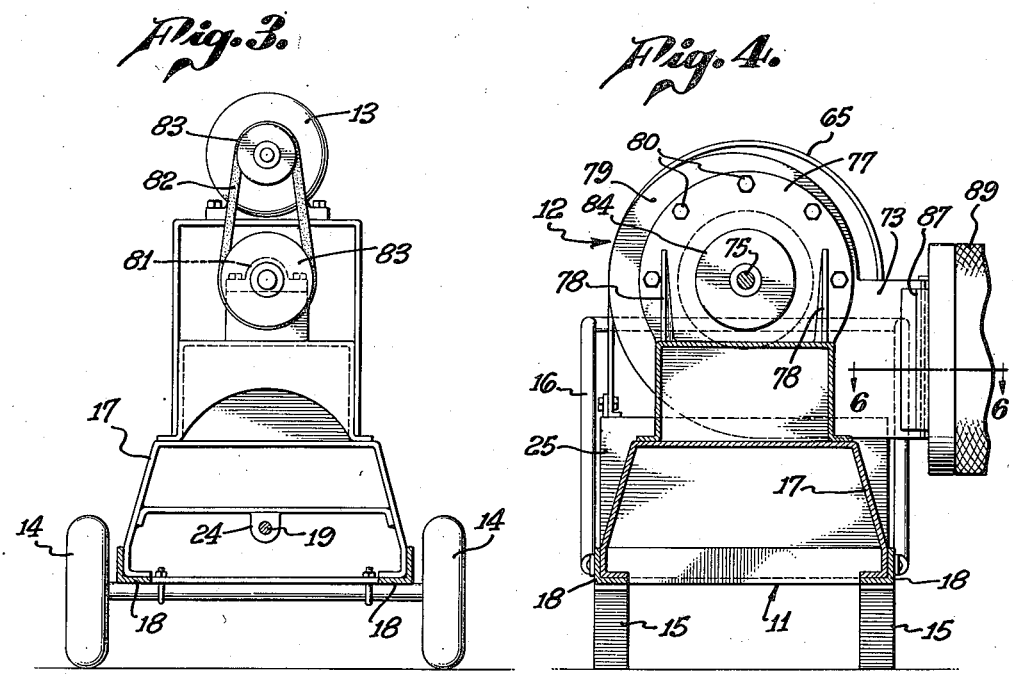
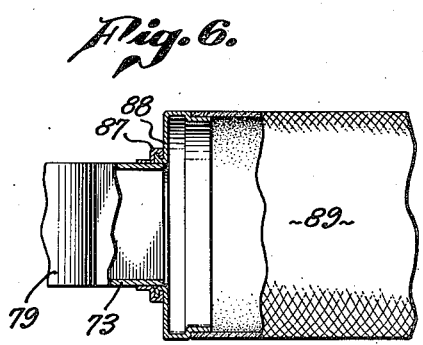
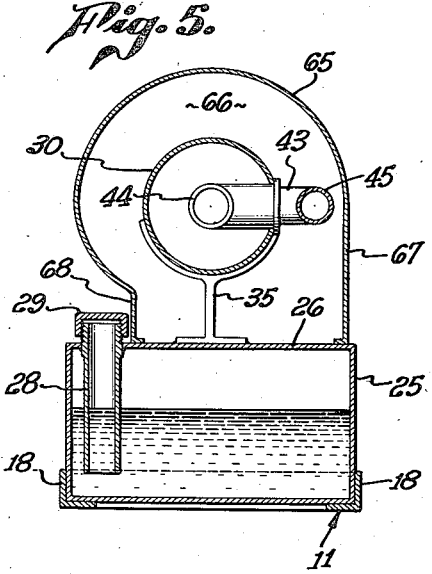
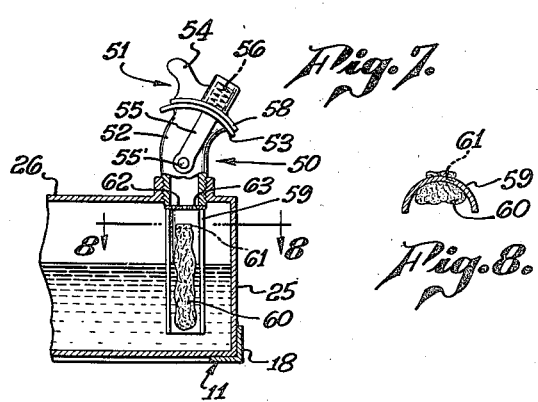
INVENTOR.
WILLIS L. SCHEU,
BY
ATTORNEYS.

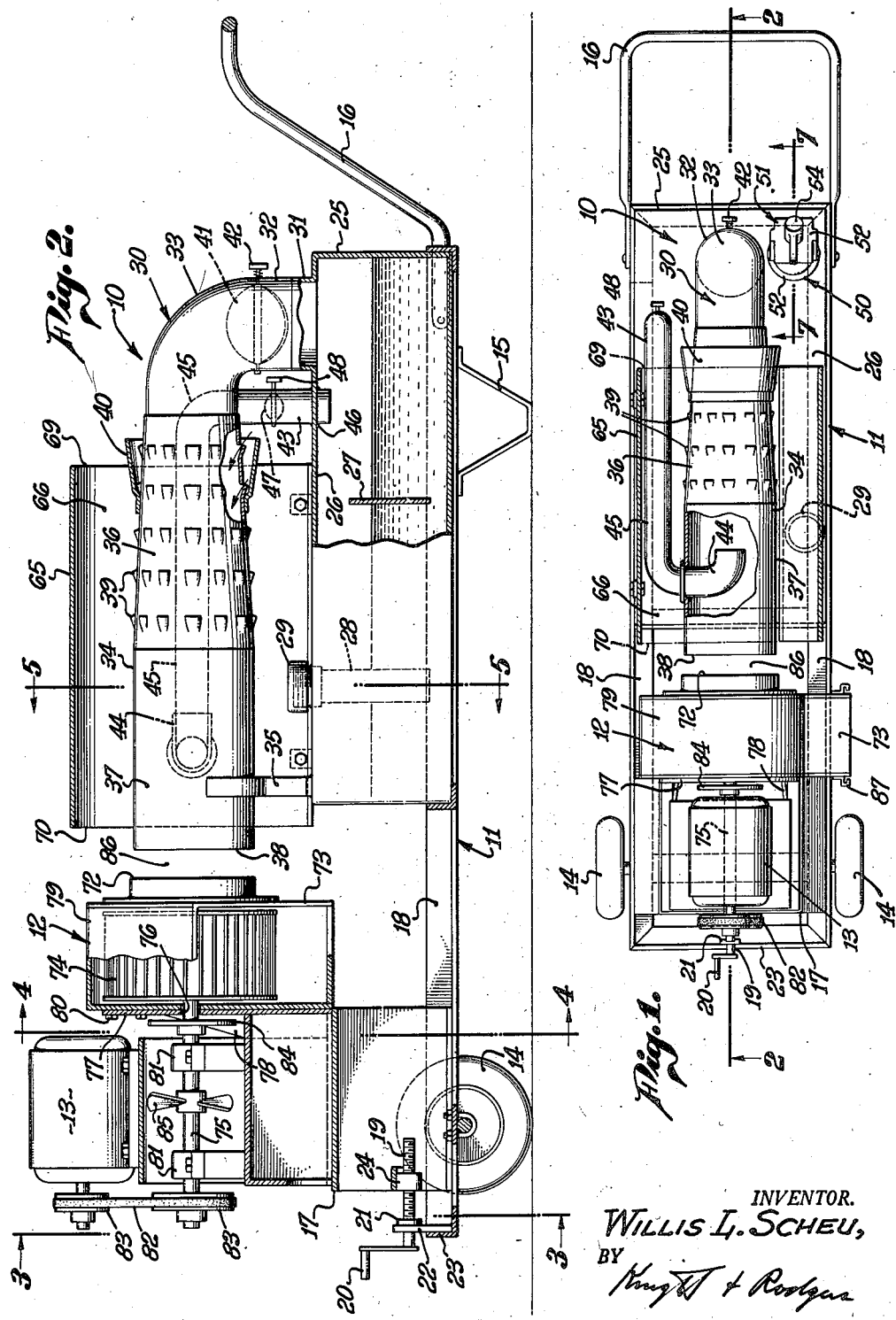

UNITED STATES PATENT OFFICE 2,579,158

HEATING SYSTEM

Willis L. Scheu, Upland, Calif., assignor to Scheu Manufacturing Company, a corporation of California Application February 24, 1948, Serial No. 10,209

1 Claim. (Cl. 263—19)

This invention relates to heating systems, and more particularly pertains to heating systems which may suitably be used in conditions requiring the development and circulation of large quantities of heated air, such as drying operations and temporary heating of buildings and areas in which no permanent heating system is installed.

The use of such heating devices as the so-called "salamanders" and similar fire-pots and stoves is uneconomical where large areas or cubic volumes are to be heated, because such devices give forth a large part of their developed heat in the form of radiation which is effective only locally, and because of stack losses and the equivalent vertical dispersion of heat from open fires. Means must be provided for venting many of such devices to the atmosphere away from the zone to be heated, either because the products of combustion are a menace to health or to cleanliness or because the intensity of the heat of such products is overly great. In such operations as drying plaster or tempering concrete in semi-finished buildings, or in drying lumber and other products of industry, many small heating units are frequently used to obtain wide distribution of heat, with accompanying multiplication of inefficiency and of costs of attendance. In attempting to conserve developed heat, the heat of combustion may be reduced to the point where combustion is far from complete and soot, smoke, and dangerous quantities of carbon monoxide result; or conversely to avoid these undesired products, high temperatures may be developed which not only waste heat but may create fire hazards.

It is a principal object of this invention to provide a heating system capable of heating large quantities of air with high combustion efficiency and a minimum development of obnoxious products of combustion.

Another object of the invention is to provide a heating system in which large quantities of air are mixed with the products of combustion and with the accompanying excess air of combustion, in order both to dilute any residual unburned particles and vapors to such low degree of concentration as to render them unobnoxious and to utilize to the fullest extent the developed heat of combustion in directly heating the so-admixed air.

A further object of the invention is the provision in a heating system as above-described, of simple and effective means for regulating both the quantity of admixed air and its temperature prior to admixture so as to control both the volume and the temperature of the mixture.

Still another object of the invention is to provide a heating system as above-described in which air is caused to flow over heated surfaces prior to its admixture with the products of combustion and a portion of the air so heated is diverted and mixed with fuel vapors to assist in the combustion thereof.

Another object is to provide a system in which air is caused to flow around an enclosed combustion chamber prior to admixture with fuel vapors or with combustion gases from said combustion chamber, so as to heat such air and also prevent excessive transfer of heat from the combustion chamber to the surrounding atmosphere.

A further object of the invention is to provide a mechanism combining the functions of a draft generator for promoting combustion and of a heat distributor for delivering the heat of combustion in usable form at such places as it may be required.

Yet another object of the invention is to provide in one mechanism a heat distributor and means for delivering air to a combustion chamber to promote combustion and to intensify the development of heat to be distributed.

Another object of the invention is to provide in one mechanism a heat distributor and means for regulating the quantity of fuel consumed so as to quantitatively control the generation of heat to be distributed.

A more detailed object of the invention is to provide in one mechanism a blower for the distribution of a mixture of air and gaseous products of combustion, arranged to dilute the latter to utilizable concentration and temperature, and combustion apparatus arranged to utilize the draft created by the blower both to regulate the rate of fuel consumption and to promote the efficiency of combustion.

A further object of the invention is to provide a heating system incorporating a distributing blower and combustion apparatus as above-described, which is compact, simple in its operation, and portable so as to be available for temporary installations.

A particular object of the invention is to provide a heating system which requires only a relatively inexpensive liquid fuel for its operation, and in which the combustion of such fuel is so conducted and so utilized as to accomplish the other purposes or objects hereinbefore mentioned.

A further object is to provide a liquid fuel heating system in which the liquid fuel is vaporized and the resulting fuel vapors are mixed with air and burned within a stack, and in which the heat of combustion of such fuel vapors is utilized to heat the liquid fuel and promote vaporization thereof.

The heating system embodying the present invention may comprise combustion apparatus having the character of oil-burning heaters of the type commonly used for orchard heating. Such heaters, as recently developed, generate a large amount of heat and, when the fuel oil has been properly vaporized and the resulting vapor has been adequately mixed with air at a proper temperature to support combustion, are capable of burning with a clean, intense flame and of emitting comparatively little smoke and soot.

The heater may be mounted on a barrow or other wheeled support and is preferably arranged to have its stack horizontally disposed, for convenience in portability and for other reasons relating to ease and efficiency of operation which will appear hereinafter.

A rotary blower, preferably of the multi-blade centrifugal fan type, and operated by any suitable power generator such as an electric motor or a small gas engine, is also provided, preferably also mounted on the wheeled support with a slidable mounting which permits the intake of the blower to be spaced selectively in relation to the discharge end of the heater stack. A hood surrounding the heater stack and open at both ends conducts air to the blower, which is arranged to operate so as to induce a draft through both the stack and the hood, the relative amount of draft through each being governed by the aforesaid adjustment of the blower. The air drawn through the hood and the products of combustion emanating from the stack are mixed in the blower and discharged therefrom to the zone to be heated.

A conduit may be secured to the outlet of the blower to conduct the heated air, and cooled and diluted gases to any desired portion or portions of the zone. The adjustment of the blower relative to the stack not only regulates the volume and temperature of the air-gas mixture but, in connection with a preferred type of heater, also regulates the rate of combustion of the fuel, by creating greater or less draft through the stack and through a return pipe leading from the stack to the fuel receptacle.

Further objects of the invention will be apparent from or will be specifically pointed out in the following description of one embodiment of the invention illustrated in the accompanying drawings, in reference whereto:

Fig. 1 is a plan view of a heating system embodying the principles of my invention, the hood being shown in section and the heater stack being partly broken away to show the return pipe;

Fig. 2 is largely a medial vertical sectional view on the lines 2—2 of Fig. 1, and on an enlarged scale, a conventional electric motor drive and certain other parts being shown in elevation;

Fig. 3 is a transverse vertical sectional view on the line 3—3 of Fig. 2, showing substantially the blower end of the system in elevation, the blower itself and the heater and the air conducting hood being omitted;

Fig. 4 is a transverse vertical sectional view on the line 4—4 of Fig. 2, illustrative of the blower and the discharge conduit thereof;

Fig. 5 is a transverse vertical sectional view on the line 5—5 of Fig. 2, the blower being omitted;

Fig. 6 is a horizontal sectional view on the line 6—6 of Fig. 4; showing the discharge conduit connection to the heater;

Fig. 7 is a vertical sectional view on the line 7—7 of Fig. 1, and on a further enlarged scale, showing a preferred mechanism for lighting the heater; and Fig. 8 is a horizontal sectional view on the line 8—8 of Fig. 7, and on a still further enlarged scale.

Having reference now to the details of the drawings, the numeral 10 designates generally a heater unit mounted on a supporting frame 11. A rotary blower 12 and a motor 13 for driving the blower are also supported on the frame 11, which is provided with wheels 14, legs 15, and a handle 16, so that the entire above-described assemblage may be transported as a unit, in the manner of wheeling a barrow. The blower 12 and motor 13 are mounted on a sub-frame 17, which is slidable lengthwise on the side members 18 of the frame 11, its position being controlled by a screw 19 operated by a handle 20 and retained by a collar 21 so as to rotate freely in a bracket 22 attached to an end member 23 of the frame 11 and engaging a threaded lug 24 secured to the subframe 17.

The heater 10 may be of any suitable type adapted to develop a large amount of heat with a minimum of soot and smoke, but is preferably an oil-burning heater operating on the principles of combustion developed in connection with orchard heating and commonly known as a "stack heater" or "vaporizing type heater," as distinguished from ordinary "salamanders" and "smudge pots." Stack heaters having the features hereinafter described as aids to fuel-vaporization and combustion, have proved able to maintain a clean flame, with very little fouling by accumulation of carbon deposits and with a minimum of effluence of smoke and soot. They have also demonstrated ability to generate a large amount of heat when operated at or near capacity and to operate with good efficiency and economy over a wide range of fuel consumption per unit of time. They are furthermore relatively inexpensive to manufacture and burn a grade of fuel commonly available at low cost.

The heater 10, as herein illustrated, is provided with an elongated receptacle 25 for containing fuel oil. The receptacle 25 is secured to the frame 11 and has an upper wall or cover 26 and may have one or more transverse baffles 27 to prevent sloshing of the fuel when the unit is transported. It may be filled through a fuel supply pipe 28 which is provided with a removable filling cap 29 and preferably extends below the normal fuel level in the receptacle so as to be sealed by the liquid fuel against excessive escape of vapor in the event that the filling cap 29 is loose.

A stack 30 is secured to an opening or throat 31 adjacent one end of the cover 26 and has an upright portion 32, a bend 33, and a horizontal portion 34 extending above and adjacent the cover 26 to a position adjacent the other end of said cover where it is supported by a bracket 35. The horizontal portion 34 constitutes a combustion chamber and is shown as having a conical wall portion 36 provided with means for admitting air and a cylindrical wall portion 37 which defines the stack outlet and terminates in a discharge opening 38. The conical wall portion 36 is provided with a plurality of longitudinally and circumferentially spaced openings or louvers 39, for admitting air to the combustion chamber from the exterior of the stack. An annular baffle 40, secured to the conical wall 36 and flaring towards the bend 33, segregates those louvers 39 nearest the bend 33 from the others and provides a funnel-shaped partial enclosure therefor. A disc-shaped damper 41 is preferably mounted in the upright portion 32 and may be turned to different positions by handle 42. Said damper is movable to a vertical position to provide substantially unobstructed flow of vapor from fuel receptacle 25 to stack 30; to a horizontal position to substantially shut off such vapor flow; and to different intermediate positions to control such vapor flow.

Means for recirculating a portion of the hot products of combustion from the stack 30 to the fuel receptacle 25 are provided by a return pipe 43 which may communicate at one end with the stack within or beyond the combustion zone to receive hot combustion products therefrom and communicates at its other end with the interior of the fuel receptacle 25. Said return pipe is shown as extending through the stack outlet wall 37 beyond, or near the end of, the main combustion zone, and having an intake portion 44 extending within the stack and directed rearwardly toward the combustion chamber (that is, toward the inlet end of the stack) and a portion 45 extending parallel to the stack to a position adjacent the bend 33 and then turned downwardly to be introduced through the cover 26 as at 46. It will be understood however that the return pipe may be of any desired form and may extend into the fuel receptacle 25 at any desired position spaced from the stack inlet opening 31. A damper 47 may also be provided in the return pipe 43, said damper being shown as similar to damper 41 and provided with a handle 48 for movement thereof to different angular positions to control or shut off the return flow of hot combustion gases through said pipe.

An air inlet device 50, illustrated in detail in Figs. 7 and 8, admits air to the receptacle 25 through the cover 26 and also serves as a means for maintaining a small flame for the purpose of vaporizing the fuel in the receptacle. The device 50 is preferably provided with means for regulating the rate of introduction of air and may be of any suitable type such as ordinarily used in orchard heaters. By way of illustration I have shown a device having a regulating closure 51 comprising a nipple 52 secured to the cover 26 and terminating at its upper end in an arcuate flange 53, and a cap 54 held thereto by pivot arms 55 and spring 56. The arms 55 are pivotally supported at 55' on nipple 52. The cap 54 has an arcuate portion 58 engageable with the flange 53. When the cap is in closed position as shown in Fig. 7, the portion 58 is in sealing engagement with flange 53 so as to close the upper end of nipple 52 and to prevent entry of air into the receptacle through device 50. When the cap 54 is swung as permitted by the arms 55, the portion 58 is moved over the flange 53 so as to uncover a portion of the open upper end of the nipple 52. The area of the opening and the rate of admission of air may be controlled by the position to which the cap is swung about the pivotal supports 55'. Internally of the receptacle 25 the nipple 52 supports a semicylindrical member 59 which extends to a position adjacent the bottom of the receptacle 25 and contains a wick 60 threaded through a slot 61. A disc 62 with perforations 63 separates the nipple 52 and member 59 to restrict and distribute the inflow of air.

A hood 65, which may be secured to the cover 26 of the fuel receptacle 25, encompasses the major portion of the stack 30 and of the return pipe 43, and is open at its ends to provide for passage of air therethrough. The hood 65 is preferably largely of circular cross-section and is so mounted on the cover 26 as to be substantially concentric with the stack 30 so as to leave an annular space or air duct 66 between it and the stack, the wall of the stack being also the inner wall of said duct so as to transfer heat thereto as described hereinafter. The return pipe 43 also extends within said annular space (see Fig. 5). The hood 65 is supported upon the cover 26 at one side by a wall portion 67 tangential to the circular portion of the hood, and at the other side by a wall portion 68 arranged to exclude the fuel supply pipe 28 from the space 66. The length of the hood 65 is preferably such as to provide one open end 69 substantially aligned with or adjacent the position of the first row of air inlet openings 39 of the stack and a second open end 70 in proximity to the discharge opening 38 of the stack 30.

The blower 12 is preferably of the multi-blade centrifugal fan type, having a housing 79 provided with a central inlet 72 substantially coaxial and coextensive with the discharge opening 38 of the stack 30, and a lateral discharge pipe 73. The blower impeller 74 is mounted on a shaft 75 which extends through an opening 76 in a vertical frame member 77, forming part of the sub-frame 17 to which the frame member 77 is braced by brackets 78. The blower housing 79 is suitably secured to the frame member 77, as by bolts 80. The shaft 75 is mounted in bearings 81 carried by the sub-frame 17 and is driven by the motor 13 by means of a belt 82 and pulleys 83. To prevent the bearings 81 and motor 13 from becoming over-heated by gases escaping through the opening 76 and by radiation from the frame member 77, a guard-disc 84 may be carried by the shaft 75 so as to screen the opening 76 and a fan 85 may also be mounted on the shaft to provide a positive circulation of air past the bearings.

The motor 13 may be an electric motor, such as a variable speed induction motor, or a gasoline engine or any other suitable type of drive motor, preferably such as to permit some speed adjustment either in the motor itself or in the driving connection to the blower, for the purpose of adjusting the total volume of air delivered by the blower.

The blower housing 79 may be arranged so that the discharge pipe 73 is directed radially upwardly or downwardly or horizontally as may be convenient. As herein illustrated the discharge pipe 73 is directed laterally, and is provided adjacent its discharge end with a grooved member 87 adapted to engage a corresponding member 88 on a conduit 89 in the manner of a bayonet lock. The conduit 89 is preferably of heat-resistant flexible material or of light metal sections joined in the manner well known in the art of making flexible metallic hose or tubing, so that it may be conveniently arranged to conduct the heated air from the blower 12 to any part of the zone to be heated. In the absence of a conduit, the tangential direction of the discharge pipe 73 will still serve to conduct the hot air and gases away from the motor 13 and bearings 81.

It will be seen that the inlet 72 of blower 12 is spaced axially from and beyond the discharge opening 38 of the stack 30 and the adjacent open end 70 of the hood 65. The blower housing 79 extends radially outward beyond the inlet 72, so that the blower 12, stack 30, and hood 65 combine to define a space 86 which in conjunction with the air duct through the space 66 defined by the hood and the stack forms a passage for air from the open end 69 of the hood to the discharge end of the stack and to the inlet of the blower, and this passage may be throttled or expanded by changing the position of the blower relatively to the heating unit 10 so as to move the blower inlet 72 toward or away from the discharge end of the stack. A mixture of the effluxes from the stack and from the air duct 66 will be formed in the space 86, which mixture may be diluted and lowered in temperature by the admixture of additional air drawn directly into said space from the atmosphere, such additional air being drawn in between the blower inlet 72 and the end 70 of the hood and not passing through the air duct 66.

In the operation of this heating system the fuel receptacle 25 may be filled to a suitable level through the inlet pipe 28 with a suitable quantity of liquid fuel such as marine diesel, bunker grade, or other fuel oil commonly used for orchard heating. The initial fuel level should be somewhat below the cover, so as to leave the lower end 46 of return pipe 43 exposed and provide a space above the fuel for flow of vaporized fuel into the stack and for flow of returned combustion products from pipe 43 to the stack. The fuel may be lighted in the ordinary way by the introduction and ignition of a quantity of more volatile fuel through the air inlet device 50, which is moved to open position as described above, so as to admit sufficient air to maintain a small flame adjacent the surface of the fuel at the device 50. The heat generated thereby and transmitted to the fuel oil directly and through the semi-cylindrical member 59 will cause vaporization of a portion of the fuel oil. The small flame so maintained will consume practically all of the air entering the receptacle 25 through the device 50, so that general combustion of most of the vaporized fuel will not be supported within the receptacle.

The operation of blower 12 creates a draft in stack 30 and receptacle 25 so as to maintain an inflow of air at device 50 at a rate that may be controlled by operation of the regulating closure 51, as described above. The draft also causes the fuel vapors to be drawn from the fuel receptacle into the stack, where they may be ignited in the combustion chamber formed by the conical wall portion 36 of the stack 30, by introducing and igniting a quantity of more volatile liquid fuel through louvers 39. The combustion of vaporized fuel in the stack is maintained by air entering through the louvers 39.

The draft in the stack 30 also causes a portion of the hot products of combustion from the cylindrical wall portion 37 of the stack to enter the return pipe 43 and to return therethrough to the fuel receptacle 25. These recirculated hot combustion products pass through the receptacle, thus heating the fuel therein and so increasing the rate of development and effluence of combustible vapor. The hot combustion products are mixed with fuel vapors in the receptacle and are drawn therewith into the stack. When the stack 30 is heated by the flame developed in said combustion chamber, radiant heat from the horizontal portion 34 of the stack, which is substantially parallel to the cover 26, will heat the cover and cause further heating and vaporization of the fuel oil within the fuel receptacle 25. The air inlet device 50 may then usually be closed, or partly closed, particularly when only low rates of combustion are desired, so as to extinguish the flame at the air inlet device. If desired, however, some admission of air at this point may be maintained so as to continually maintain a small flame to assist in the vaporization of fuel.

Dampers 41 and 47 may be adjusted to regulate the passage of vaporized fuel into the stack and the return flow of combustion products through return pipe 43.

Because of the proximity of the blower inlet 72 to the open end 70 of the hood 65, a draft will also be induced through the hood and the air drawn into the air duct 66 will be heated by contact with and radiation from the stack 30. As the louvers 39 for the most part open into the air duct 66, the air drawn through the louvers will be somewhat pre-heated as a further aid to combustion. As a result of the temperature to which the combustible vapors are raised by the heated cover 26, by the hot products of combustion returning through the pipe 43, and by the flame at the air inlet device 50 (if in use) and also because of the raised temperature of the air entering the louvers 39, the heating unit 10 will produce a very clean and intense flame substantially clear of smoke and soot as it passes out of the stack. The available heat of combustion will be substantially fully developed, and the subsequent admixture of cooler air in the space 86 will not cause waste of combustible matter. It may be noted that the substantial enclosure of the return pipe 43 in the air duct 66 assists in maintaining the temperature of the gases in that pipe.

At low rates of combustion, there may be a tendency for some unburned combustible vapors to blow out of some of the louvers at the fore part of the combustion chamber in intermittent jets. The annular baffle 40 is provided to screen these louvers from the air-duct 66 so as to prevent such escaping unburned vapors from being carried to the blower 12. The jets of unburned vapors from the louvers are trapped in the funnel-shaped space formed by the baffle 40, and are entrained with the air being drawn in through this space and returned with the air to the combustion chamber through the louvers.

The hot combustion products from the stack 30 and the heated air from the air duct 66, with some admixture of additional air drawn in directly between the blower inlet 72 and the end 70 of the hood, from the atmosphere in the surrounding space, are mixed in the space 86 and drawn into the blower 12 and, after a more thorough mixing in the blower, are discharged through the conduit 89, by which they may be conducted to a desired location. In order to secure complete combustion and freedom from soot or other unburned combustible constituents it is necessary to maintain a very hot flame in the combustion zone in the stack 25. However, in accordance with my invention, the resulting high temperature products of combustion are admixed as described above with a considerably greater volume of air beyond the combustion zone so as to provide a much greater volume of air at a moderate temperature suitable for space heating, such as 200° to 300° F. for example, and the concentration of carbon dioxide and other combustion products is so reduced as to be unobnoxious and non-injurious.

If the blower inlet 72 is moved towards the stack discharge opening 38, by the screw 19, the draft through the stack is increased relatively to the draft through the air duct 66, and the rate of combustion in the heater unit 10 is thereby increased. The quantity and temperature of the combustion gases are thus increased and the amount of outside air taken in at the space 86 is decreased. Consequently the temperature of the gases discharged by the blower and the concentration of products of combustion in these gases will both be increased, while the total volume of hot air delivered is decreased. Conversely, moving the blower inlet 72 away from the stack discharge opening 38 will reduce the temperature and dilute the concentration of the mixture, while increasing the total volume of heated air delivered by the blower.

The disc damper 41 may also be used to regulate both the rate of combustion and the concentration and temperature of the mixed air and products of combustion. Its direct effect upon the rate of combustion will be obvious. If moved toward a throttling position it will decrease the draft in the fuel receptacle and increase the draft through both the air duct 66 and the louvers 39. If such increase in draft through the louvers 39 does not result in excess air for combustion, but only in providing sufficient air, an increase in temperature and a greater freedom from smoke and soot may result, with a decrease in the proportion of products of combustion in the mixture. The best adjustments of the damper 41 and of the spacing of the blower inlet 72 from the stack 30 will soon become apparent to an operator accustomed to heater operation, and may be made to provide greater or less volumes of mixed air and gases, at degrees of dilution and of temperature varying within a wide range.

The operation can also be controlled by adjusting the damper 47 in return pipe 43 to vary the amount of hot combustion gases recirculated through the fuel receptacle and the consequent heating and vaporization of fuel therein. Under some conditions it may also be found desirable to close this damper completely, relying wholly on heat radiated from the stack to the fuel receptacle to heat and vaporize the liquid fuel.

Further control of the operation may be obtained by varying the speed of the blower 12, it being apparent that, under any given conditions of the other control factors mentioned above, an increase in blower speed will not only increase the total volume of heated air delivered but will also increase the burning rate of the heater 10 due to increased draft in the stack. In actual operation, I have found that the increase in burning rate thus produced is generally greater in proportion than the increase in total volume, so that both the quantity and the temperature of the air delivered by the blower are generally increased by increasing the blower speed.

Obviously my invention is subject to various modifications, hence I do not choose to be limited to the above-described example, but rather to the scope of the appended claim.

I claim:

A heating system comprising: a receptacle for holding liquid fuel to be heated and vaporized therein; a stack communicating at one end with said fuel receptacle to receive vaporized fuel therefrom and having a portion defining a combustion chamber therein and having a discharge opening at its other end beyond the combustion chamber; a hood encompassing said portion of the stack so as to define therebetween an air duct open at one end adjacent said one end of the stack for admission of air to said duct and extending to a position adjacent and around said discharge opening of the stack; said portion of the stack having a plurality of openings disposed within said hood for admitting air from said air duct to said combustion chamber; said air admitting openings being spaced longitudinally of said portion of said stack and including a set of openings positioned to admit air to the forepart of said combustion chamber, and said stack being provided with baffle means secured to the exterior thereof beyond said set of openings and flaring outwardly and rearwardly around said set of openings so as to screen the space immediately surrounding said set of openings from the air duct; and a blower having an inlet spaced from said discharge opening of the stack in position to induce draft through said stack and through said air duct.

WILLIS L. SCHEU.

REFERENCES CITED

The following references are of record in the file of this patent:

UNITED STATES PATENTS

| Number | Name | Date |
|---|---|---|
| 515,993 | Burgess | Mar. 6, 1894 |
| 1,015,410 | Thomas et al. | Jan. 23, 1921 |
| 1,876,025 | Sallee | Sept. 6, 1932 |
| 2,066,524 | Gehnrich | Jan. 5, 1937 |
| 2,077,043 | Gehnrich | Apr. 13, 1937 |
| 2,110,209 | Engels | Mar. 8, 1938 |
| 2,155,279 | McMahan | Apr. 18, 1939 |
| 2,223,597 | Brewster | Dec. 3, 1940 |
| 2,225,775 | Garrett | Dec. 24, 1940 |
| 2,231,445 | Grapp | Feb. 11, 1941 |
| 2,295,177 | King | Sept. 8, 1942 |
| 2,421,877 | Gross | June 10, 1947 |